US008331263B2

(12) United States Patent
Dow (10) Patent No.: US 8,331,263 B2
(45) Date of Patent: Dec. 11, 2012

(54) DISCOVERY OF NETWORK NODES AND ROUTABLE ADDRESSES (75) Inventor: Louis R Dow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 972 days.

(21) Appl. No.: 11/275,665

(22) Filed: Jan. 23, 2006

(65) Prior Publication Data
US 2007/0171842 A1 Jul. 26, 2007

(51) Int. Cl.
H04L 12/28 (2006.01)
H04L 12/56 (2006.01)
G06F 15/173 (2006.01)

(52) U.S. Cl. ............... 370/254; 370/395.54; 709/223

(58) Field of Classification Search .......... 370/254, 370/395.54, 392, 401; 709/223, 227
See application file for complete search history.

(56) References Cited

U.S. PATENT DOCUMENTS

| | | | |
|---|---|---|---|
| 5,185,860 A | 2/1993 | Wu | |
| 5,363,368 A | 11/1994 | Vatt et al. | |
| 5,835,720 A * | 11/1998 | Nelson et al. | 709/224 |
| 5,901,362 A | 5/1999 | Cheung et al. | |
| 6,456,306 B1 * | 9/2002 | Chin et al. | 715/810 |
| 6,978,314 B2 * | 12/2005 | Tarr | 709/245 |
| 7,492,764 B2 * | 2/2009 | Cheng et al. | 370/389 |
| 7,539,150 B2 * | 5/2009 | Lauer et al. | 370/254 |
| 2002/0003780 A1 * | 1/2002 | Braun et al. | 370/254 |
| 2002/0031135 A1 * | 3/2002 | Inoue | 370/401 |
| 2002/0143905 A1 | 10/2002 | Govindarajan et al. | 709/220 |
| 2002/0156920 A1 * | 10/2002 | Conrad et al. | 709/242 |
| 2002/0188759 A1 * | 12/2002 | Roy et al. | 709/245 |
| 2003/0074584 A1 * | 4/2003 | Ellis | 713/201 |
| 2003/0076788 A1 * | 4/2003 | Grabauskas et al. | 370/254 |
| 2003/0084162 A1 * | 5/2003 | Johnson et al. | 709/227 |
| 2003/0097425 A1 * | 5/2003 | Chen | 709/220 |
| 2003/0195957 A1 * | 10/2003 | Banginwar | 709/223 |
| 2004/0028035 A1 * | 2/2004 | Read | 370/352 |
| 2004/0037268 A1 * | 2/2004 | Read | 370/352 |
| 2004/0083306 A1 * | 4/2004 | Gloe | 709/245 |
| 2004/0111494 A1 * | 6/2004 | Kostic et al. | 709/220 |
| 2004/0111529 A1 * | 6/2004 | Parmar | 709/245 |
| 2004/0148398 A1 * | 7/2004 | Park | 709/227 |

(Continued)

FOREIGN PATENT DOCUMENTS

CN 1549501 A 11/2004

(Continued)

OTHER PUBLICATIONS

PCT Search Report dated, Jun. 22, 2007, Application No. 2006/049571, 9 pages.

(Continued)

*Primary Examiner* — Ayaz Sheikh
*Assistant Examiner* — Hoang-Chuong Vu
(74) *Attorney, Agent, or Firm* — Lee & Hayes, PLLC (57) ABSTRACT

Systems and related methods for discovering network nodes and routable addresses include a scan server, local link segment, an agent coupled to the local link segment, and a router coupled to place the scan server in communication with the agent. The scan server commands the agent to discover a network node coupled to the local link segment. The agent is responsive to commands from the scan server to discover a network node coupled to the local link segment. The agent also obtains a link-local address for the network node, and obtains a routable site-local address to which the link-local address maps. The agent provides the routable site-local address to the scan server.

18 Claims, 4 Drawing Sheets

U.S. PATENT DOCUMENTS

| | | | |
|---|---|---|---|
| 2004/0207863 A1* | 10/2004 | Christiansen | 358/1.13 |
| 2004/0210630 A1 | 10/2004 | Simonnet et al. | 709/203 |
| 2004/0221041 A1* | 11/2004 | Tabbara | 709/227 |
| 2004/0225750 A1* | 11/2004 | Lim et al. | 709/245 |
| 2005/0002380 A1* | 1/2005 | Miller et al. | 370/352 |
| 2005/0030955 A1* | 2/2005 | Galin et al. | 370/401 |
| 2005/0182829 A1* | 8/2005 | King et al. | 709/220 |
| 2005/0198310 A1* | 9/2005 | Kim et al. | 709/227 |
| 2006/0002311 A1* | 1/2006 | Iwanaga et al. | 370/254 |
| 2006/0067343 A1* | 3/2006 | Tagawa et al. | 370/401 |
| 2006/0114911 A1* | 6/2006 | Nguyen | 370/395.4 |
| 2006/0293061 A1* | 12/2006 | Kobayashi et al. | 455/455 |
| 2007/0002767 A1* | 1/2007 | Holman et al. | 370/255 |
| 2007/0058642 A1* | 3/2007 | Eisink | 370/401 |
| 2007/0147419 A1* | 6/2007 | Tsujimoto et al. | 370/466 |
| 2007/0157295 A1* | 7/2007 | Mangalore et al. | 726/6 |
| 2008/0098088 A1* | 4/2008 | Tamano et al. | 709/218 |
| 2012/0002571 A1* | 1/2012 | Lovy et al. | 370/254 |

FOREIGN PATENT DOCUMENTS

| | | |
|---|---|---|
| EP | 0455402 A2 | 11/1991 |
| EP | 1211843 A1 | 6/2002 |
| JP | 2006020157 A | 1/2006 |
| RU | 2230435 C2 | 6/2004 |
| RU | 2237367 C2 | 9/2004 |
| WO | WO9619085 A2 | 6/1996 |
| WO | WO0239642 A2 | 5/2002 |

OTHER PUBLICATIONS

Bellovin, "Worm propagation strategies in an IPv6 Internet," ;login:, vol. 31, No. 1, Feb. 2006, pp. 70-76.

Hokari, "Thorough Learning of One Theme, Thorough Understanding of IPv6, Learning IPv6 Technologies," N+1 Magazine Network Guide, vol. 1, No. 1, pp. 88-94, May 1, 2001.

Shiota, "At least, you need to know this, Reintroduction to TCP/IP (27th Installment), IPv6 (3), ICMPv6 giving various notifications," Nikkei Internet Solutions, vol. 74, pp. 116-123, Aug. 22, 2003.

Chinese Office Action mailed Mar. 1, 2012 for Chinese patent application No. 200680051534.0, a counterpart foreign application of U.S. Appl. No. 11/275,665, 9 pages.

Extended EP Search Report mailed Feb. 14, 2012 for European patent application No. 06850387.9, 7 pages.

Hokari, "Thorough Learning of One Theme, Thorough Understanding of IPv6, Learning IPv6 Technologies," N+1 Magazine Network Guide, vol. 1, No. 1, pp. 88-94, May 1, 2001 (from JP Office Action dated May 6, 2011, Reference 2).

Translated Japanese Office Action mailed Mar. 27, 2012 for Japanese patent application No. 2008-551275, a counterpart foreign application of U.S. Appl. No. 11/275,665, 6 pages.

Translated Japanese Office Action mailed May 6, 2011 for Japanese Patent Application No. 2008-551275, a counterpart foreign application of U.S. Appl. No. 11/275,665, 2 pages.

Kawai, "Provide each PC with measures against unauthorized access, Personal firewalls are released one after another, Vendors target products at enterprises," Nikkei Internet/Technology, No. 36, pp. 14-16, Jun. 22, 2000 (from JP Office Action dated Mar. 27, 2012, Reference 1).

Saito, "Personal firewall, Protect clients, Selected based on the detail levels of items which can be set and operability," Nikkei Internet Technology, No. 42, pp. 180-187, Dec. 22, 2000 (from JP Office Action dated Mar. 27, 2012, Reference 2).

Shiota, "At least, you need to know this, Reintroduction to TCP/IP (27th Installment), IPv6 (3), ICMPv6 giving various notifications," Nikkei Internet Solutions, vol. 74, pp. 116-123, Aug. 22, 2003 (from JP Office Action dated May 6, 2011, Prior Art Literature).

* cited by examiner

DISCOVERY OF NETWORK NODES AND ROUTABLE ADDRESSES

BACKGROUND

Network administrators frequently need to discover the active machines on a given computer network. The techniques used to discover the machines may depend on the protocol or protocols underlying the computer network. When operating under a networking protocol such as Version 4 of the Internet Protocol (hereinafter, "IPv4"), a number of tools and techniques may be available to perform various network management functions, machine discovery or port scanning. When the network in question contains only IPv4 segments, then any of these available tools or techniques may be appropriate. Even if no tools or techniques are available or appropriate, a brute force search on an IPv4 network might entail searching about 16,384 possible addresses, given a /18 network having a network mask of 255.255.192.0. Using a combination of multithreaded and asynchronous programming techniques, such a brute force search would take about a minute.

Other more advanced network protocols are being introduced and increasingly adopted. These newer network protocols support much larger address spaces than previous network protocols. One example of such an advanced network protocol is Version 6 of the Internet Protocol (hereinafter, "IPv6"). IPv6 supports an address space of 128 bits, 64 bits of which are reserved for host addressing. This means that there might be $2^{64}$ (184,467,441,000,000,000,000) addresses where hosts might be found.

If the network in question contains at least some IPv6 segments, the tools available under IPv4 may not operate efficiently on the IPv6 segments, or may not operate on such segments at all. Resorting to a brute-force approach for locating nodes in an IPv6 network would mean searching across 184,467,441,000,000,000,000 potential addresses. Scanning a block of addresses this large, assuming probes are sent out at a rate of 1/second, yields a duration of approximately 5,865,494,028,540 years. Even with a hybrid multithreaded and asynchronous communications model enabling 1,000 probes per second or more, the duration remains unacceptable.

SUMMARY

Systems, methods, and/or techniques ("tools") for discovering network nodes and routable addresses include a scan server, local link segment, an agent coupled to the local link segment, and a router coupled to place the scan server in communication with the agent. The scan server commands the agent to discover one or more network nodes coupled to the local link segment. The agent is responsive to commands from the scan server to discover a network node coupled to the local link segment. The agent obtains a link-local address for the network node, and obtains a routable site-local address to which the link-local address maps. The agent provides the routable site-local address to the scan server.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTIONS OF THE DRAWINGS

The same numbers are used throughout the disclosure and figures to reference like components and features. The first digit in a reference number indicates the drawing figure in which that reference number is introduced.

DETAILED DESCRIPTION

Overview

The following document describes tools capable of many techniques and processes. The following discussion describes exemplary ways in which the tools enable discovery of network nodes and routable addresses. This discussion also describes ways in which the tools perform other techniques as well.

This document is organized into sections for convenience, with the sections introduced by headings chosen for convenience, but not limitation. First, Operating Environments are described in connection with FIGS. 1-2, which illustrate operating environments related to discovering network nodes and routable addresses, and also provide illustrative data flows. Next, Process Flows are described in connection with FIGS. 3-4, which illustrate process flows related to discovering network nodes and routable addresses.

Operating Environments

Figure 1:
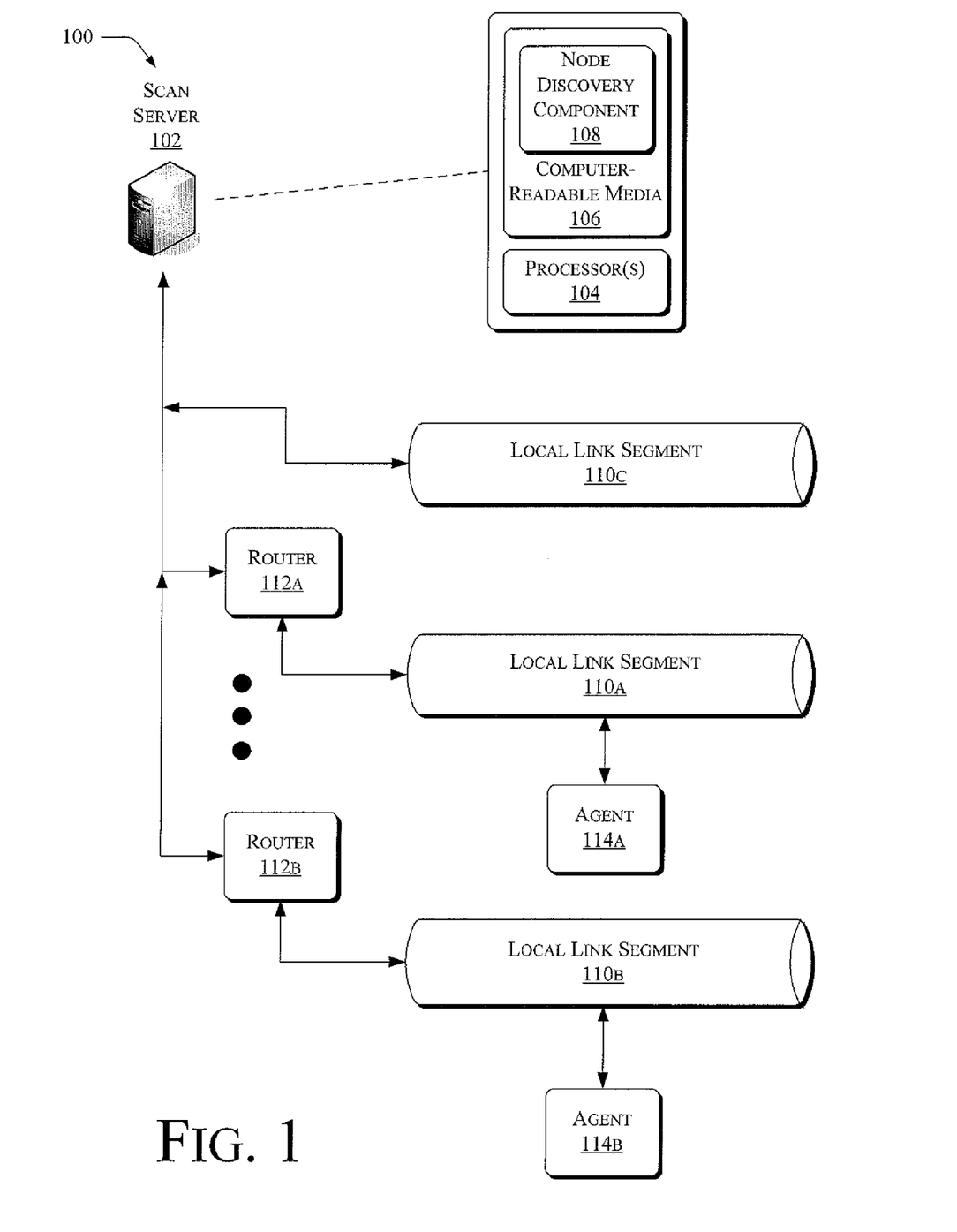
FIG. 1 is a block diagram of an operating environment for discovering network nodes and routable addresses.

FIG. 1 illustrates an operating environment 100 for discovering network nodes and routable addresses. The operating environment 100 may comprise a scan server 102. The scan server 102 may comprise a computing device, such as a network or other server, desktop computer, or the like. In general, the scan server 102 is responsible for scanning one or more given networks, locating machines on the networks, determining their security states, what services the machines are exposing on the network, or the like. The scan server 102 may be deployed, for example, to service a network in a given enterprise, which may include a corporate, academic, or other suitable environment.

The scan server 102 may include one or more processor(s) 104 and computer-readable media 106. The computer-readable media may contain instructions that, when executed by the processor 104, perform any of the methods described herein. The processor 104 may be configured to access and/or execute the computer-readable media 106. The computer-readable media 106 may comprise or have access to a node discovery component 108, which may be implemented as a module, program, or other entity capable of interacting with a network-enabled entity. The node discovery component 108 may be configured as described herein to discover a set of network nodes and routable addresses for such nodes, and to provide the same to the scan server 102. The node discovery component 108 and scan server 102 may find particular applicability in the context of network protocols that support an address space large enough that brute-force node discovery techniques are infeasible. One non-limiting example of such a network protocol is the IPv6 protocol described above.

The scan server 102 may access one or more local link segments 110 through routers 112 that correspond to each of these local link segments 110. For convenience only, FIG. 1 shows two local link segments 110a and 110b. However, it is understood that possible implementations of the operating environment 100 could include any number of local link segments 110. The local link segments 110 are understood to include one or more computers connected to a given common connector, such as a given network cable. Accordingly, all computers within a given local link segment 110 may communicate with one another without passing through a router 112.

For convenience only, FIG. 1 shows two routers 112*a* and 112*b*. However, it is understood that possible implementations of the operating environment 100 could include any number of routers 112. Typically, the number of routers 112 in a given network corresponds to the number of local link segments 110. It is also noted that the term "router" is used herein only for descriptive purposes only, and not for limitation. For example, the routers 112 could take the form of switches or other components. More generally, the routers 112 interface the scan server 102 to the local link segments 110 to enable communication therebetween.

The local link segments 110 include at least one agent 114. For convenience only, FIG. 1 shows two agents 114*a* and 114*b*, which are associated with local link segments 110*a* and 110*b*, respectively. However, it is understood that more than one agent 114 could be included in a given local link segment 110. Generally, the agents 114 are responsive to commands from the scan server 102 and/or the node discovery component 108, and the agents 114 provide responses to the same. In but one possible scenario, the agents 114 could be implemented as software performing the functions described herein, and could execute in connection with any suitable hardware configuration. The scan server 102 may be aware of all configured agents 114 by, for example, DNS name and/or last known IP address. In but one possible implementation, information relating to the configured agents 114 may be stored in a data store accessible to the scan server 102. However, the scan server 102 may not be aware of other nodes within the local link segments 110, aside from the agents 114, until the scan server 102 performs node discovery as described herein. Thus, while the local link segments 110 may have any number of machines attached thereto, the node discovery component 108 on the scan server 102 is not aware of the number of such machines until it has performed node discovery.

The scan server 102 may use the node discovery component 108 to discover the network nodes within at least a part of a given network over which the scan server 102 has responsibility. If the scan server 102 wishes to discover all nodes within the entire network, the node discovery component 108 may communicate with all agents 114 within the entire network. If the scan server 102 wishes to discover only those nodes within a subnet of the entire network, the node discovery component 108 may communicate with only those agents 114 within the subnet of interest to the scan server 102.

In some implementations, the scan server 102 may be associated with a local link segment 110*c*, as shown in FIG. 1. In such implementations, this local link segment 110*c* may not be associated with an agent 114, and all functions described herein as being performed by the agent 114 may instead be performed by the scan server 102.

Having described the overall operating environment 100 above in FIG. 1, the discussion now turns to an operating environment at a given local link segment 110, now described in connection with FIG. 2.

Figure 2:
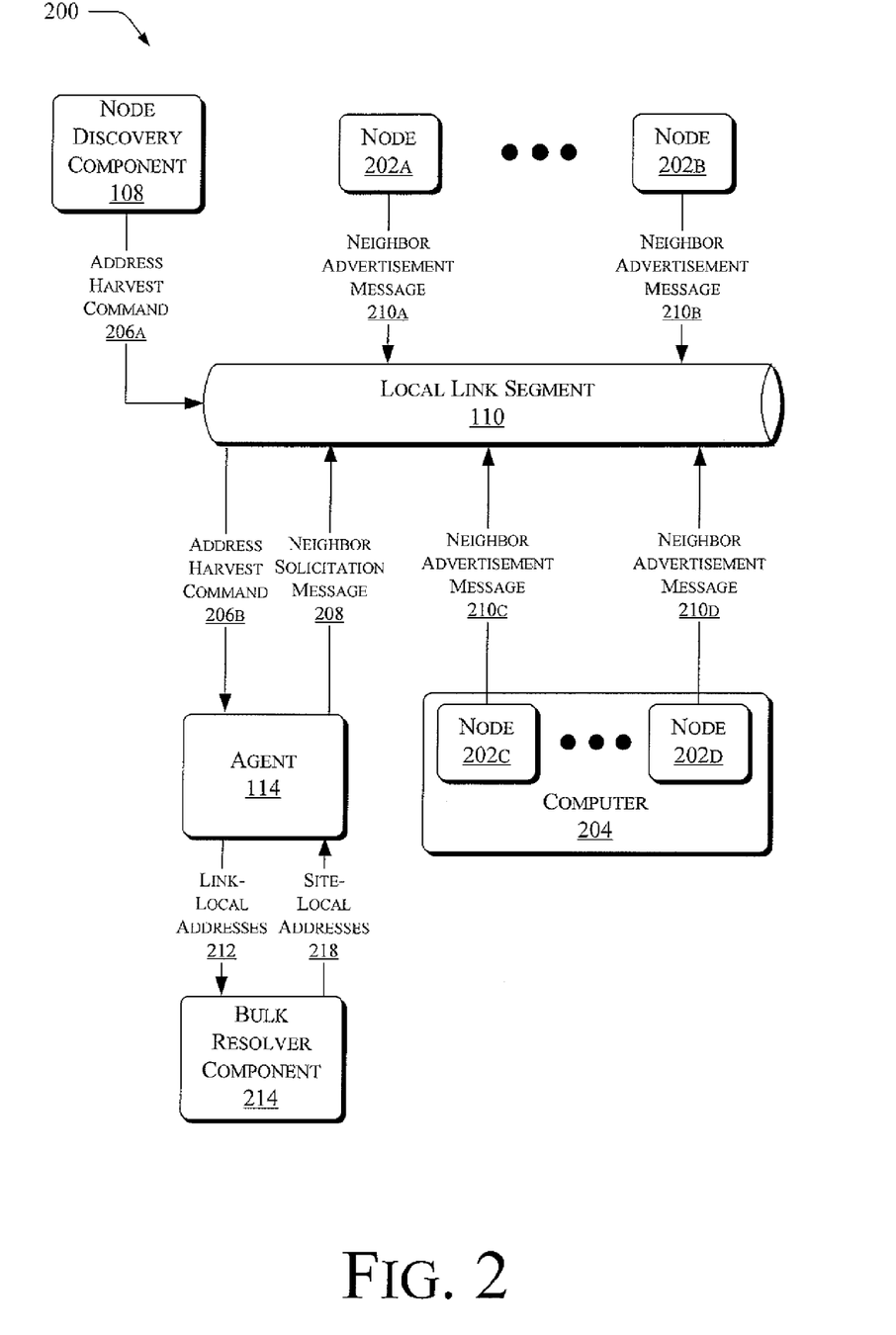
FIG. 2 is a block diagram of an operating environment pertaining to a given local link segment.

FIG. 2 illustrates an operating environment 200 pertaining to a given local link segment 110. The operating environment 200 represents a local link segment 110 that is within a subnet that is of interest to the scan server 102. The local link segment 110 shown in FIG. 2 is understood to be any of the local link segments 110*a* or 110*b* shown in FIG. 1. Likewise, a representative node discovery component 108 and agent 114 are carried forward from FIG. 1 for convenience. The router 112 is omitted from FIG. 2, although it is understood that commands and responses passing between the node discovery component 108 and the agent 114 may pass through one or more routers 112 or similar components.

One or more nodes 202 are associated with the local link segment 110, in addition to the agent 114. For convenience only, FIG. 2 shows four nodes 202*a*, 202*b*, 202*c*, and 202*d*. It is noted that in the context of IPv6, "nodes" are considered to be network cards by which a given computer may access a network. Thus, FIG. 2 shows a computer 204 as containing two nodes 202*c* and 202*d*, which may be two different network cards plugged into the computer 204. In some implementations, the nodes 202 may be associated with respective, unique IP addresses. In other implementations, the nodes 202 may be bound together as a single IP address.

When the scan server 102 wishes to perform node discovery on the local link segment 110, the node discovery component 108 may issue an Address Harvest command 206 to the agent 114 at the local link segment 110. The term "Address Harvest" is chosen herein for convenience of reference only, but not for limitation. It is understood that other commands that are associated with functionality similar to that described herein may be referenced by labels other than "Address Harvest".

The Address Harvest command 206 passes from the node discovery component 108 to the local link segment 110, referenced for convenience only as Address Harvest command 206*a*. From the local link segment 110, the agent 114 may then access the Address Harvest command, referenced for convenience only as 206*b*.

After receiving the Address Harvest command 206, the agent 114 sends a Neighbor Solicitation message 208 to all nodes 202 on the local link segment 110. A suitable example of the Neighbor Solicitation message 208 is the message defined under ICMPv6 type 135, code 0, which may be sent to the link-local multicast address for "all nodes" (ff02::1). The nodes 202 on the link-local segment 110 respond with a Neighbor Advertisement message 210. For convenience only, FIG. 2 shows respective messages 210*a*, 210*b*, 210*c*, and 210*d* corresponding to the nodes 202*a*, 202*b*, 202*c*, and 202*d*. A suitable example of the Neighbor Advertisement message 210 is the message defined under ICMPv6 type 136, code 0. Assuming that the nodes 202 are compliant with RFC 2461 (q.v.), the nodes 202 will respond to the message 208 with the messages 210.

The agent 114 maintains a list of all responses 210 received within a reasonable window of time after the message 208 is sent. The applicable time window may be specified as a default, or the window may be fine-tuned or adjusted to compensate for noisy or high-latency networks. For clarity of illustration, the responses 210 are shown passing only to the local link segment 110, although it is understood that the agent 114 may access these responses 210 on the local link segment 110.

The messages 210 from the various nodes 202 provide respective addresses 212 for the nodes 202, and are collected by the agent 114. However, these addresses 212 are link-local addresses, as that term is understood in the context of IPv6. In IPv6, link-local addresses end in "%2" (scope ID 2). The link-local addresses 212 may be viewed as a sort of physical address that maps to network cards on the nodes 202. For convenience only, the link-local addresses for all of the nodes 202 are represented collectively by the line 212 in FIG. 2.

The link-local addresses 212 have validity or meaning only on the local link segment 110. The link-local addresses 212 have no validity or meaning across the router 112 for that given local link segment 110. Thus, the link-local addresses 212 may not be immediately useful to the scan server 102 in their present form. Thus, the agent 114, once it has finished harvesting the link-local addresses 212, provides them to a bulk resolver 214, with a request to convert the link-local addresses 212. The bulk resolver 214 is shown separate from the agent 114 only for convenience of discussion and illustration. In some implementations, the agent 114 and the bulk resolver 214 may be integrated with one another.

The bulk resolver 214 converts the link-local addresses 212 into corresponding site-local addresses 218. Unlike the link-local addresses 212, the site-local addresses 218 have validity or meaning across the router 112 for the given local link segment 110. Thus, the site-local addresses 218 are said to be "routable". However, it is noted that the site-local addresses 218 may have validity or meaning only within the enterprise managed by the scan server 102. Thus, the site-local addresses 218 may not be valid addresses on the Internet, for example.

The bulk resolver 214 performs address resolution so as to acquire a list of site-local addresses 218 in the form IP addresses for each node 202. An example of a suitable name resolution API for performing this conversion is the getaddrinfo API, which is an IETF API that may be implemented by software developers in order to be compliant with global internetworking standards. For example, the getaddrinfo API may be invoked using AI_NUMERICHOST as a hint. In any event, the getaddrinfo API returns, for each node 202, all addresses associated with that node 202.

The resolved addresses may be filtered to produce a list of site-local IPv6 addresses 218 (scope ID 5) that the scan server 102 may use. In IPv6, site-local addresses end in "%5". The agent 114 places the site-local addresses 218 onto the local link segment 110, where they are accessible to the node discovery component 108 of the scan server 102.

Once it has received the site-local addresses 218 for a given local link segment 110, the scan server 102 may then communicate with the nodes 202 on the given local link segment 110. The scan server 102 may then perform any number of operations directed toward managing the nodes 202. For example only, the scan server 102 may perform port scanning or security-related functions on the various nodes 202. As another example, the scan server 102 may compile data from which a network map may be produced. More specifically, some applications, such as the VISIO® drafting software (available from Microsoft Corporation of Redmond, Wash.) may offer a "Map My Network" or similar function to users. If the user selects this function, the application may draw a picture of the user's network.

Having described FIGS. 1 and 2, several observations are noted. The operating environments 100 and 200 enable node discovery in the context of networks that support relatively large address spaces, such as IPv6 networks. Instead of a brute-force search through the entire address space, the operating environments 100 and 200 use the local agents 114 to discover the nodes 202 on the local link segments 110. In virtually any feasible implementation, the number of agents 114 will be far less than the number of possible addresses in, for example, a 64-bit address space.

Process Flows

Figure 3:
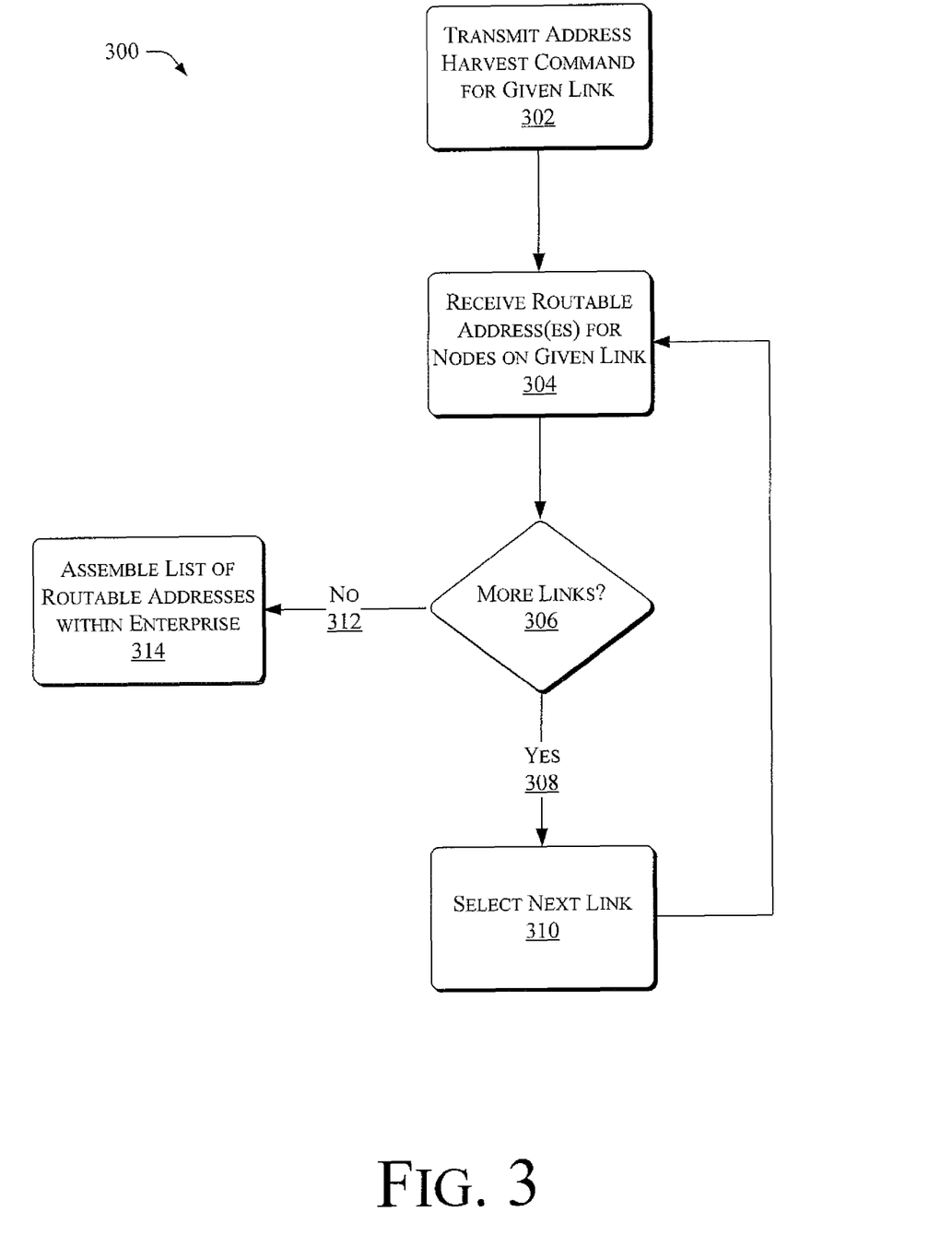
FIG. 3 is a flow diagram of a process for obtaining a list of routable addresses within a given enterprise.

FIG. 3 illustrates a process flow 300 for obtaining a list of routable addresses within a given enterprise. For convenience and ease of discussion, the process flow 300 is described here in connection with the scan server 102, and/or the node discovery component 108, as well as other aspects of the operating environments 100 and 200. However, it is understood that the process flow 300 may be implemented on devices or components other than the scan server 102, the node discovery component 108, or the other components shown in the operating environments 100 and 200 without departing from the spirit and scope of the description herein.

Turning to the process flow 300 in more detail, block 302 transmits an Address Harvest command for a given local link segment. An example of the Address Harvest command is the Address Harvest command 202 shown in FIG. 2. Block 302 may be performed by the scan server 102. The Address Harvest command may be directed to a selected agent 114 that is associated with the given local link segment 110.

Block 304 receives routable addresses for one or more nodes associated with a given local link segment. Examples of these nodes include the nodes 202 shown in FIG. 2, and an example of the local link segment is the local link segment 110 shown in FIG. 1. Block 304 may be performed by the scan server 102.

Block 306 tests whether any more local link segments 110 are of interest. For example, the scan server 102 may obtain routable addresses for an entire network, or any portion thereof. If there are more local link segments 110 of interest, the process flow 300 takes Yes branch 308 to block 310.

Block 310 selects another local link segment 110. Afterwards, the process flow 300 returns to block 302 to repeat blocks 302-306 for this next local link segment 110.

From block 306, if there are no more local link segments 110 of interest, for example, to the scan server 102, then the process flow 300 takes No branch 312 to block 314. Block 314 assembles a list of routable addresses for all network nodes 202 discovered from all of the local link segments 110 processed in a given iteration of the process flow 300. Given this list of network nodes 202 and corresponding routable addresses, the scan server 102 or another component may communicate directly with all of the discovered nodes 202 through, for example, the routers 112.

Figure 4:
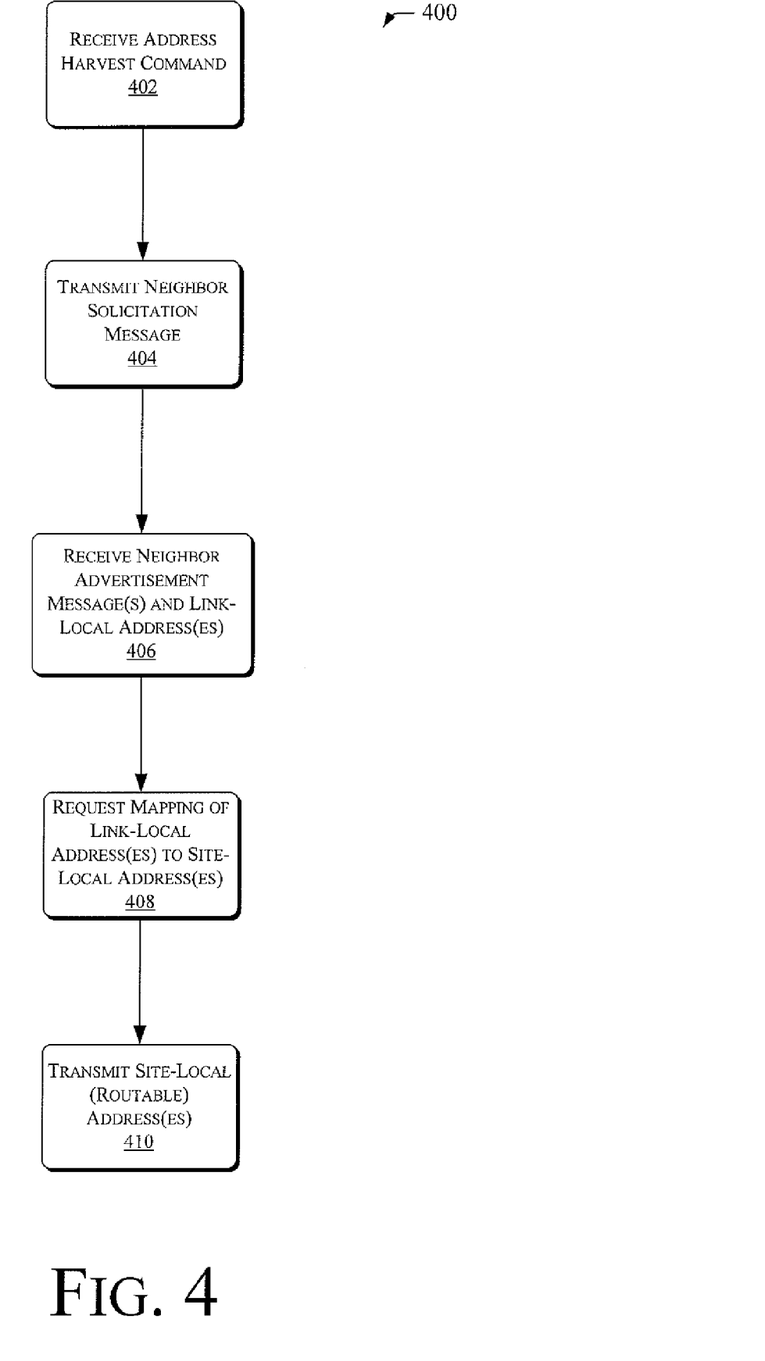
FIG. 4 is a flow diagram of a process for generating a list of routable addresses for one or more nodes within the given local link segment.

FIG. 4 illustrates a process flow 400 for generating a list of routable addresses for one or more nodes within a given local link segment. For convenience and ease of discussion, the process flow 400 is described here in connection with the agent 114, and/or the node discovery component 108, as well as other aspects of the operating environments 100 and 200. However, it is understood that the process flow 400 may be implemented on devices or components other than the agent 114, the node discovery component 108, or the other components shown in the operating environments 100 and 200 without departing from the spirit and scope of the description herein.

Turning to the process flow 400 in more detail, block 402 receives an Address Harvest command, such as the Address Harvest command 202 as issued by the node discovery component 108 and/or the scan server 102. Block 402 may be performed by an agent 114 at a selected local link segment 110.

Block 404 transmits a message such as the Neighbor Solicitation message 208 shown in FIG. 2. Block 404 may be performed by the agent 114 at the selected local link segment 110, and the Neighbor Solicitation message may be transmitted so that it is received by one or more network nodes, such as the nodes 202 shown in FIG. 2.

Block 406 receives a message such as the Neighbor Advertisement message 210 shown in FIG. 2. Block 406 may be performed by the agent 114 at the selected local link segment 110, and respective Neighbor Advertisement messages may be received from one or more network nodes, such as the nodes 202 shown in FIG. 2. Block 406 also receives link-local addresses corresponding to the Neighbor Advertisement messages. Examples of the link-local addresses include the addresses 212 shown in FIG. 2.

Block 408 requests that the link-local addresses received in block 406 be mapped or converted to site-local addresses. For example, the agent 114 may submit the request shown in block 408. This request may be fulfilled by, for example, a DNS API or the getaddrinfo API referenced above. In any event, the entity servicing this request may be part of or separate from the agent 114.

Block 410 receives and transmits the set of site-local addresses for all discovered nodes (e.g., nodes 202) discovered within a given local link segment 110. Block 410 provides the data requested by the Address Harvest command received in block 402. Examples of the site-local addresses sent by block 410 are the site-local addresses 218 shown in FIG. 4. The site-local addresses sent by block 410 are routable, and may be received by, for example, the node discovery component 108 and/or the scan server 102.

CONCLUSION

Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain flow diagrams described and illustrated herein, it is noted that the processes and sub-processes depicted therein may be performed in orders other than those illustrated without departing from the spirit and scope of the description herein.

The invention claimed is:

1. A system comprising:
    at least one scan server within an enterprise network, the scan server configured to locate machines on the enterprise network and determine security states of the machines and services the machines are exposing on the enterprise network;
    at least one local link segment within the enterprise network;
    at least one agent within the enterprise network coupled to a corresponding one of the at least one local link segment; and
    at least one router coupled to place one of the at least one scan server in communication with one of the at least one agent, the communication between the scan server and the agent flowing through the at least one router;
    wherein responsive to a request of the scan server to discover at least one network node coupled to the local link segment, the agent is configured to:
        send a query message on the local link segment,
        maintain one or more responses from one or more network nodes on the local link segment within a predetermined time window after sending the query message, the predetermined time window being adjustable to compensate for noisiness and latency of the local link segment,
        obtain a link-local address corresponding to a network node of the one or more network nodes,
        convert the link-local address that is valid only within the local link segment to a routable site-local address that is valid within the enterprise network and invalid on a public network, and
        provide the routable site-local address to the scan server via the at least one router, and
    wherein a time delay between the scan server sending the request to the agent to discover the at least one network node and the agent providing the routable site-local address to the scan server is configured to be less than or equal to a preconfigured response time.

2. The system of claim 1, wherein the scan server includes a node discovery component adapted to issue commands to the agent and to receive the routable site-local address therefrom.

3. The system of claim 1, further comprising at least a second local link segment and at least a second router placing the scan server in communication with the second local link segment, and further comprising at least a second agent coupled to the second local link segment, wherein the second agent is responsive to the scan server to discover at least a second network node coupled to the second local link segment, to obtain a second link-local address corresponding to the second network node, to obtain at least a second routable site-local address to which the second link-local address maps, and to provide the second routable site-local address to the scan server.

4. The system of claim 1, wherein the agent is configured to receive an address harvest command from the scan server via at least one of the at least one router, and is configured to issue a neighbor solicitation message to the network node of the one or more network nodes in response thereto.

5. The system of claim 4, wherein the agent is configured to receive a neighbor advertisement message from the network node of the one or more network nodes in response to the neighbor solicitation message, wherein the neighbor advertisement message includes at least the link-local address.

6. The system of claim 1, further comprising a bulk resolver component that is configured to receive the link-local address from the agent and to map the link-local address to the routable site-local address.

7. The system of claim 1, wherein the routable site-local address includes 64 bits reserved for host addressing.

8. A method comprising:
    under control of one or more processors configured with executable instructions:
    receiving a command to discover a plurality of network nodes coupled to a local link segment on an enterprise network, the command being received from a scan server configured to locate machines on the enterprise network and determine security states of the machines and services the machines are exposing on the enterprise network;
    sending a message on the local link segment to discover the plurality of network nodes coupled to the local link segment;
    maintaining one or more responses that are received from one or more network nodes within a predetermined time window after sending the message, the predetermined time window being adjustable to compensate for noisiness and latency of the local link segment;
    converting one or more link-local addresses included in the one or more responses received from the one or more network nodes into one or more site-local addresses, wherein the one or more link-local addresses are valid only within the local link segment and the one or more site-local addresses are valid within the enterprise network and invalid on a public network; and
    sending the one or more site-local addresses associated with the one or more network nodes to the scan server, wherein a time delay between receiving the command to discover the plurality of network nodes from the scan server and sending the one or more site-local addresses to the scan server is configured to be less than or equal to a preconfigured response time.

9. The method of claim 8, wherein receiving the command includes receiving an address harvest command.

10. The method of claim 8, wherein the one or more responses include a neighbor advertisement message.

11. The method of claim 8, wherein the message includes a neighbor solicitation message.

12. The method of claim 8, further comprising:
receiving an address harvest command from the scan server via a router; and
issuing a neighbor solicitation message to the plurality of network nodes in response thereto.

13. The method of claim 12, further comprising receiving one or more neighbor advertisement messages from the one or more network nodes in response to the neighbor solicitation message, wherein the one or more neighbor advertisement messages include at least the one or more link-local addresses.

14. The method of claim 8, wherein the one or more site-local addresses include 64 bits reserved for host addressing.

15. One or more computer-usable storage memories for storing computer-executable instructions that, when executed by one or more processors, perform acts comprising:
receiving a command to discover a plurality of network nodes coupled to a local link segment on an enterprise network, the command being received from a scan server configured to locate machines on the enterprise network and determine security states of the machines and services the machines are exposing on the enterprise network;
sending a message on the local link segment to discover the plurality of network nodes coupled to the local link segment;
maintaining one or more responses that are received from one or more network nodes within a predetermined time window after sending the message, the predetermined time window being adjustable to compensate for noisiness and latency of the local link segment;
converting one or more link-local addresses included in the one or more responses received from the one or more network nodes into one or more site-local addresses, wherein the one or more link-local addresses are valid only within the local link segment and the one or more site-local addresses are valid within the enterprise network and invalid on a public network; and
sending the one or more site-local addresses associated with the one or more network nodes to the scan server, wherein a time delay between receiving the command to discover the plurality of network nodes from the scan server and sending the one or more site-local addresses to the scan server is configured to be less than or equal to a preconfigured response time.

16. The one or more computer-usable storage memories of claim 15, the acts further comprising:
receiving an address harvest command from the scan server via a router; and
issuing a neighbor solicitation message to the plurality of network nodes in response thereto.

17. The one or more computer-usable storage memories of claim 16, further comprising receiving one or more neighbor advertisement messages from the one or more network nodes in response to the neighbor solicitation message, wherein the one or more neighbor advertisement messages include at least the one or more link-local addresses.

18. The one or more computer-usable storage memories of claim 15, wherein the one or more site-local addresses include 64 bits reserved for host addressing.

* * * * *